(12) United States Patent
Altintas et al.

(10) Patent No.: US 8,594,033 B2
(45) Date of Patent: Nov. 26, 2013

(54) FREQUENCY BAND COORDINATION METHOD AND RADIO COMMUNICATION APPARATUS IN COGNITIVE RADIO SYSTEM

(75) Inventors: Onur Altintas, Tokyo (JP); Yuji Oie, Kitakyushu (JP); Masato Tsuru, Kitakyushu (JP); Kazuya Tsukamoto, Kitakyushu (JP)

(73) Assignees: Toyota Infotechnology Center Co., Ltd., Tokyo (JP); Kyushu Institute of Technology, Fukuoka (JP)

( * ) Notice: Subject to any disclaimer, the term of this patent is extended or adjusted under 35 U.S.C. 154(b) by 254 days.

(21) Appl. No.: 13/121,596

(22) PCT Filed: Dec. 7, 2009

(86) PCT No.: PCT/JP2009/070471
§ 371 (c)(1),
(2), (4) Date: Mar. 29, 2011

(87) PCT Pub. No.: WO2010/067773
PCT Pub. Date: Jun. 17, 2010

(65) Prior Publication Data
US 2011/0176508 A1 Jul. 21, 2011

(30) Foreign Application Priority Data
Dec. 8, 2008 (JP) .................. 2008-312545

(51) Int. Cl.
*H04W 4/00* (2009.01)

(52) U.S. Cl.
USPC .................. 370/329; 455/450; 455/456.1

(58) Field of Classification Search
USPC ......... 370/328, 329, 462, 338, 501; 455/67.1, 455/68, 130, 423, 509, 511, 552, 450, 456.1
See application file for complete search history.

(56) References Cited

U.S. PATENT DOCUMENTS

2006/0009230 A1* 1/2006 Fukumoto et al. ............ 455/450
2008/0171552 A1* 7/2008 Hyon et al. .................. 455/450

(Continued)

FOREIGN PATENT DOCUMENTS

JP 2005-086816 3/2005
JP 2006-094005 4/2006

(Continued)

OTHER PUBLICATIONS

Tague et al. "Probabilistic Mitigation of Control Channel Jamming Via Random Key Distribution", The 18th Annual IEEE International Symposium on Personal, Indoor and Mobile Radio Communications (PIMRC 07), 2007, total pp. 5.*

Ileri, O., et al.; "Demand Responsive Pricing and Competitive Spectrum Allocation via a Spectrum Server"; 2005 IEEE International Symposium on New Frontiers in Dynamic Spectrum Access Networks; Baltimore, MD; USA; Nov. 2005; 9 pages.

(Continued)

*Primary Examiner* — Andrew Chriss
*Assistant Examiner* — Peter Mak
(74) *Attorney, Agent, or Firm* — Alston & Bird LLP

(57) ABSTRACT

There is provided a technique of establishing a communication between a transmitting node and a receiving node by selecting a suitable frequency band for communication without using a predetermined control channel. Firstly, a frequency band to be used as a control channel is selected from among low frequency bands, and information on frequencies and information on application's quality requirements are exchanged between the transmitting node and the receiving node using the control channel. Then, a frequency band to be used as a data channel is determined, and a communication is started. During the communication, frequency use statuses around the transmitting node and the receiving node are notified through the control channel, and when the control channel or data channel being used becomes unusable, the channel is dynamically changed. Since a low frequency band having a long propagation distance is used as the control channel, exchange of information through the control channel can be performed before communication through a data channel in a high frequency band becomes possible, the data channel that meets the quality requirements can be determined quickly.

7 Claims, 13 Drawing Sheets

(56) References Cited

U.S. PATENT DOCUMENTS

2008/0299918 A1* 12/2008 Jallon .................. 455/103
2010/0002264 A1    1/2010 Ito

FOREIGN PATENT DOCUMENTS

| JP | 2006-304310 | 11/2006 |
| JP | 2007-166488 | 6/2007 |
| JP | 2009-545227 | 12/2009 |
| WO | WO 2006/047572 A1 | 5/2006 |
| WO | WO 2008/013429 A2 | 1/2008 |

OTHER PUBLICATIONS

Jing, X., et al.; "Spectrum Co-Existence of IEEE 802.11b and 802.16a Networks using the CSCC Etiquette Protocol"; Journal; Mobile Networks and Applications; vol. 11; Issue 4; Kluwer Academic Publishers; Higham, MA; USA; Aug. 2006; pp. 243-250.

Zhao, J., et al.; "Distributed Coordination in Dynamic Spectrum Allocation Networks"; 2005 IEEE International Symposium on New Frontiers in Dynamic Spectrum Access Networks; Baltimore, MD; USA; Nov. 2005; 10 pages.

International Search Report for International Application No. PCT/JP2009/070471, mailed Mar. 9, 2010; 2 pages.

* cited by examiner

FREQUENCY LIST (INITIAL STATE)

OPERATING FREQUENCY BANDS OF TERMINAL

FREQUENCY BANDS SUITABLE FOR CONTROL CHANNEL

NARROWED-DOWN COORDINATION RANGE

COORDINATION RANGE NARROWED DOWN BY HASH FUNCTION

UNUSED FREQUENCIES

COORDINATION OF FREQUENCY BANDS TO BE SCANNED
(DATA CHANNEL)

FIG. 11

| FREQUENCY | STATUS |
|-----------|--------|
| f1 | 0 |
| f2 | 1 | ← CONTROL CHANNEL
| f3 | 1 |
| . | . |
| . | . |
| f4 | -1 |
| f5 | 1 | ← DATA CHANNEL
| f6 | 1 |

54

(A)

IN THE CASE WHERE PRIMARY USER IS DETECTED (B)

IN THE CASE WHERE DETERIORATION OF
COMMUNICATION QUALITY OCCURS

US 8,594,033 B2

FREQUENCY BAND COORDINATION METHOD AND RADIO COMMUNICATION APPARATUS IN COGNITIVE RADIO SYSTEM

CROSS REFERENCE TO RELATED APPLICATION

This application is the national phase application under 35 U.S.C. §371 of PCT international application No. PCT/JP2009/070471 filed on Dec. 7, 2009, which claims priority to Japanese patent application No. 2008-312545 filed on Dec. 8, 2008, the contents of which are incorporated herein by reference.

TECHNICAL FIELD

The present invention relates to a technique of determining a frequency band to be used in a cognitive radio system, in particular to a technique of determining a frequency band to be used in an ad hoc cognitive radio network that does not have a predetermined control channel.

BACKGROUND ART

In recent years, cognitive radio systems that detect and use an unused frequency band have been studied and developed. Usable frequency bands change with time and location due to communications by primary users, the mobility of terminals, or other reasons. Therefore, it is important to determine an appropriate frequency band to be used for communication quickly.

In many studies on cognitive radio systems, it is assumed that there is a common control channel.

For example, non-patent literature 1 discloses a method that utilizes a common spectrum coordination channel (CSCC). Each radio node broadcasts frequency usage information (e.g. user ID such as IEEE MAC address, frequency band being used, and transmission power etc.) in the CSCC at regular time intervals. Neighboring nodes observe such notifications, and a user that has newly become active creates a spectrum activity map, and if there is a usable frequency, the user selects that frequency.

Non-patent literature 2 describes utilizing a central spectrum policy server (SPS) in order to coordinate spectrum requests made by a plurality of cognitive radio network operators. In the technique according to this study, spectrum allocation is performed by a center in a centralized manner, and it is assumed that a common control channel is used for spectrum allocation and spectrum coordination.

In a technique described in non-patent literature 3, each radio node participates in a local coordination group based on similarity in the usable channel to form a small multi-hop network. In this group, interconnections are maintained by using a common control channel, and the members in the same group communicate directly with each other. The network connection is maintained by users that are participating in a plurality of coordination channels and located at group boundaries. Such "bridge" nodes relay traffics between groups and interconnect users in spatial domains of different spectrum availability.

In systems, such as IEEE 802.22 systems, in which there is a base station (BS), the BS allocates frequency channels to terminals based on the results of sensing of the frequency use status by the terminals. Since the allocation of frequency channels is performed by a control section such as a BS, it is not necessary for transmitting node and receiving node to notify each other of a frequency channel to be used when establishing a connection. In addition, if the radio condition changes during communication, and the frequency channel being used is to be changed, the frequency channel can be easily changed by a command from the BS.

CITATION LIST

Non-Patent Literature

Non-Patent Literature 1: X. Jing, D. Raychaudhuri, "Spectrum Co-existence of IEEE 802.11b and 802.16a Networks using the CSCC Etiquette Protocol", Proceedings of IEEE DySPAN 2005, Nov. 2005

Non-Patent Literature 2: O. Ileri et al., "Demand Responsive Pricing and Competitive Spectrum Allocation via a Spectrum Server", Proceedings of IEEE DySPAN 2005, Nov. 2005

Non-Patent Literature 3: J. Zhao, H. Zheng and G. Yang, "Distributed Coordination in Dynamic Spectrum Allocation Networks", Proceedings of IEEE DySPAN 2005, Nov. 2005

SUMMARY OF THE INVENTION

Technical Problem

However, radio communication systems, such as ad hoc radio communication, that do not use infrastructures (such as access points) cannot use a common control channel like that described above or a centralized control section. Therefore, notification of frequency bands to be used at the time of establishing a connection and changing of the frequency band being used during communication are difficult in such radio communication systems.

In view of the above, an object of the present invention is to provide a technique that enables selecting a frequency band suitable for communications between transmitting and receiving nodes to establish a communication without using a predetermined control channel and dynamically changing the frequency band being used in accordance with changes in the environment even during the communication.

Solution to Problem

To achieve the above object, according to the present invention, coordination of frequency bands used in a cognitive radio network is performed by the following means or processes.

In a frequency band coordination method according to the present invention, a control channel is firstly established, a transmitting node and a receiving node communicate frequency use statuses around them through the control channel to establish a data channel, and data communication is performed. After the communication is established, information on the surrounding frequency use statuses is exchanged through the control channel to cope with dynamic changes in the surrounding conditions, and the frequency bands used as the control channel and the data channel are changed when needed.

By separating the control channel and the data channel, the transmitting node and the receiving node can exchange various information through the control channel when determining the data channel. Therefore, a frequency band suitable for communications can be selected as the data channel. Since each of the terminals notifies the other of its surrounding frequency use status through the control channel also after the communication has been established, the frequency band to be used can be changed quickly.

More specifically, the frequency band coordination method in a cognitive radio system according to the present invention comprises:

a control channel determination step of determining a frequency band to be used as a control channel;

a data channel determination step of communicating a frequency use status around a transmitting node and a receiving node through said control channel and determining a frequency band to be used as a data channel; and a channel changing step of communicating a frequency use status around a transmitting node and a receiving node during communication through said control channel, and changing a frequency band used as the control channel or the data channel when the control channel being used or the data channel being used has become unusable or is expected to become unusable.

It is preferred that the frequency band used as the control channel be a frequency band lower than the frequency band used as the data channel. Optimally, it is preferred that the control channel be the lowest frequency band among the usable frequency bands.

In data communications, it is preferable that communications be performed in high frequency bands because high speed communications are desired. However, the control channel is desired to provide reliable communications with a long propagation distance. Therefore, by setting the control channel in a low frequency band, the above requirement can be met. In the situation in which the transmitting node and the receiving node are coming closer to each other, the control channel having a long communication distance is first established, and information on frequency statuses is exchanged before a communication through the data channel becomes possible. Therefore, a communication can be started quickly after a distance at which a communication through the data channel can be performed is reached.

Furthermore, it is preferred that the control channel determination step according to the present invention be performed in the following manner. Firstly, each of the transmitting node and the receiving node detects (by scanning) usable frequency bands in a specific frequency range suitable for the control channel. It is preferred that the specific frequency range be set as a range that is common to the transmitting node and the receiving node, but the frequency ranges need not be exactly the same. Then the transmitting node transmits a connection request using frequency bands usable by itself. Upon receiving the connection request, the receiving node transmits an acknowledgement response in these frequency bands. Since it is confirmed that the frequency bands in which the acknowledgement response has been received are usable frequency bands, the transmitting node selects any one of the frequency bands in which the acknowledgement response has been received as the control channel.

By adopting the above-described control channel determination method, even though there is no fixed control channel determined in advance between the transmission node and the receiving node, they can detect frequency bands usable by them and establish a control channel.

In the control channel determination step, it is preferred that the frequency range to be scanned be narrowed down based on the current location and the current time using a hash function that the transmitting node and the receiving node have in common.

By narrowing down the frequency range to be scanned, scanning can be completed quickly, and consequently connection can be established quickly. Furthermore, since the frequency range to be scanned is determined based on the location information and time information, the nodes that communicate with each other (which are located at the same location at the same time) will scan the same frequency range. On the other hand, nodes that are located at different locations will scan different frequency ranges. Even if the location is the same, different frequency ranges will be scanned at different times. Therefore, while nodes that communicate with each other will scan a common frequency range, nodes that do not communicate with each other will scan different frequency ranges. Therefore, efficient frequency utilization can be achieved.

It is preferred that the data channel determination step be performed in the following manner. Firstly, each of the transmitting node and the receiving node detects usable frequency bands in a frequency range that meet requirements for data communications. Thus, pursuant to requirements concerning communication speed and communication stability in data communications, the frequency range is narrowed down to a range that meets the requirements. If the frequency ranges that meet the requirements are different between the transmitting node and the receiving node, the frequency ranges may be communicated through the control channel. Each of the transmitting node and the receiving node communicates the use status of each frequency band to the other through the control channel. The transmitting node transmits probe packets using frequency bands that can be used by both the transmitting node and the receiving node, and the receiving node transmits an acknowledgement response in the frequency bands in which the receiving node has received the probe packets. Since it is confirmed that the frequency bands in which the acknowledgement response has been received are usable frequency bands, the transmitting node selects one, some or all of the frequency bands in which the acknowledgement response has been received as the data channels.

In this way, the data channel can be selected in a frequency range that meets requirements of data communication, and therefore communications with improved reliability can be achieved. Even in frequency bands available for use by the transmitting and receiving nodes (i.e. frequency bands that are not being used by other users), there is a possibility that radio waves fail to reach the receiving node. In view of this, probe packets are transmitted, whereby a frequency band(s) in which reliable communications can be performed can be selected.

In the data channel determination step, it is preferred that the transmitting node obtain location information of itself and location information of the receiving node, and further narrows down the frequency bands in which the probe packets are to be transmitted to frequency bands in which the probe packets will be delivered to the receiving node for sure, based on the distance between the transmitting node and the receiving node.

By not transmitting the probe packets in the frequency bands in which radio waves are expected not to reach the receiving node based on the distance between the transmitting node and the receiving node, the efficiency of the data channel determination process can be improved.

It is preferred that the channel changing step according to the present invention be performed in the following manner. Firstly, each of the transmitting node and the receiving node detects usable frequency bands in a frequency range that are suitable for the control channel and the data channel. Then, each of the transmitting node and the receiving node notifies the other of the use status of each frequency band through the control channel. The transmitting node transmits probe packets using frequency bands that can be used by both the transmitting node and the receiving node, and the receiving node transmits an acknowledgement response in the frequency bands in which the receiving node has received the probe packets. Based on the consequence of the above steps, frequency bands to which the control channel and the data channel are to be changed are selected from among the frequency bands in which the transmitting node has received the acknowledgement response.

By performing the scanning of the surrounding frequency condition and sharing the information between the transmitting node and the receiving node at regular intervals even after the start of communication in the above described manner, frequency bands to which the channels are to be changed can be determined in advance, and when the channels actually needs to be changed, they can be changed quickly.

In the channel changing process, the channels are changed in cases where deterioration in the communication quality or the commencement of a communication by another node in the same frequency band is detected or expected. Since it is not desirable that communication through the control channel be interrupted, it is preferred that the control channel be changed before an interruption.

In the channel changing step, the transmitting node notifies the receiving node, through the control channel, of the frequency bands in which the transmitting node has received the acknowledge response, so that this information is shared between the transmitting node and the receiving node. Each of the transmitting node and the receiving node may select frequency bands to which the control channel and the data channel are to be changed from among the frequency bands in which the acknowledge response has been received according to a common policy.

By exchanging information on the frequency use status, each of the transmitting node and the receiving node can always recognize the frequency bands usable by the other. Therefore, when the frequencies of the channels are changed, both nodes can quickly recognize frequencies to which the channels are to be changed. When a need to change the channel(s) arises, it is preferred that one node transmit to the other node a channel changing command containing information on the frequency band to which the channel is to be changed.

In the channel changing step, in the case where the control channel or the data channel has become or is expected to become unusable due to deterioration in the communication quality, it is preferred that a lower frequency band be selected as a frequency band to which the channel is to be changed. On the other hand, in the case where the control channel or the data channel has become or is expected to become unusable due to a communication started by a node other than the transmitting node and the receiving node, it is preferred that a frequency band having an appropriate quality for communication be selected as a frequency band to which the channel is to be changed.

When deterioration in the communication quality occurs, it is considered that the distance between the transmitting node and the receiving node has become large. Therefore, it is preferred that the channel be changed to a lower frequency band, which has a longer propagation distance. On the other hand, when another node starts to use the channel, there is not such a condition. Therefore, a frequency band that meets the requirements may be selected from among the frequency bands that are usable by both the transmitting node and the receiving node.

The present invention may be viewed as a frequency coordination method in a cognitive radio system including at least one or some of the above described processes or as a program for implementing this method. The present invention may also be viewed as a radio communication apparatus that coordinates frequency bands by performing the above-described processes. The above-described means and processes may be adopted in combination, where feasible, to constitute the present invention.

Advantageous Effect of Invention

According to the present invention, it is possible to establish a communication without using a predetermined control channel while selecting a frequency band suitable for communication between a transmitting node and a receiving node and to dynamically change the frequency band to be used in accordance with changes in the surrounding condition even during the communication.

BRIEF DESCRIPTION OF THE DRAWINGS

FIG. 11 is a diagram showing a frequency list.

DESCRIPTION OF EMBODIMENTS

In the following, a preferred embodiment of the present invention will be described in detail by way of example with reference to the drawings.

A cognitive radio communication system according to this embodiment is composed of a plurality of radio communication apparatuses. The radio communication apparatuses are mounted on vehicles and constitute an inter-vehicle-communication radio network. Communications between these terminals are performed while sensing the surrounding radio condition and dynamically changing the frequency band (or frequency channel) being used. This radio communication system is an ad hoc network in which radio communication apparatuses are interconnected without the aid of infrastructures such as access points. Therefore, there is no control apparatus that assigns frequency bands to be used for communications.

<General Configuration>

Figure 1:
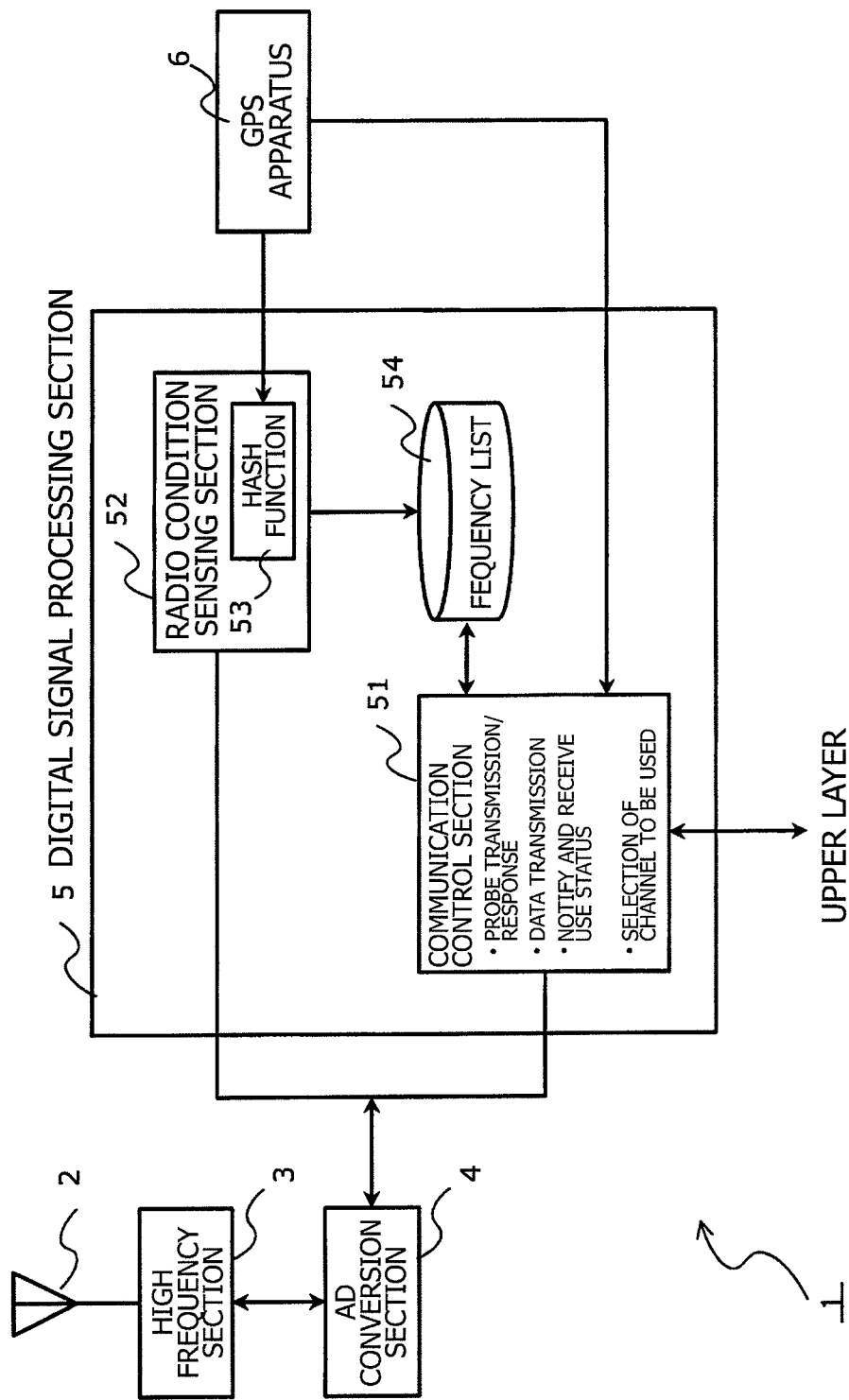
FIG. 1 is a diagram showing functional blocks of a radio communication apparatus in a cognitive radio system according to an embodiment.

FIG. 1 is a schematic diagram showing the functional configuration of a radio communication apparatus that constitutes the cognitive radio communication system according to this embodiment. The radio communication apparatus 1 has an antenna 2, a high frequency section 3, an AD conversion section 4, a digital signal processing section 5, and a GPS apparatus 6. The high frequency section 3 receives radio signals and converts them into signals in a frequency band in which digital signal processing can easily be applied. The high frequency section 3 also converts signals to be transmitted into signals having a frequency for actual transmission. The AD conversion section 4 converts received analogue signals into digital signals, and converts digital signals to be transmitted into analogue signals. In the radio communication apparatus 1, signals over a wide band (e.g. 900 MHz-5 GHz) received through the antenna 2 are AD-converted all together, and processing such as demodulation, including channel selection, is performed by the digital signal processing section 5.

The digital signal processing section 5 may be composed of a DSP (Digital Signal Processor), an FPGA (Field Programmable Gate Array), and a dynamic reconfigurable processor etc. The digital signal processing section 5 includes, as functional sections, a communication control section 51, a radio condition sensing section 52, and a frequency list 54. Although the digital signal processing section 5 further has functional sections such as one for modulation/demodulation, detailed description thereof will be omitted because they have already been well known.

The communication control section 51 performs the process of establishing connection, the process of transmitting and receiving data, the process of informing the party at the other end of communication of the use status of channels, and the process of selecting a channel to be used.

The radio condition sensing section 52 senses the radio condition around the node's own surrounding to determine whether each frequency band is used or unused (in other words, whether or not each frequency band is available for use by the node). As specific sensing techniques, various known methods may be employed. The radio condition sensing section 52 determines whether or not frequency bands are used or unused by energy detection, wavelet decomposition technique, pilot based spectrum sensing, eigenvalue based spectrum sensing, feature detection, matched filter method etc, in accordance with the radio communication scheme to be sensed. The radio condition sensing section 52 is provided with a hash function 53, with which the range over which the radio condition is to be sensed can be narrowed down based on location information and time information obtained from the GPS apparatus 6. All the radio communication apparatuses in this cognitive radio system use the same hash function 53. Therefore, if the range to be sensed is narrowed down by the hash function 53, vehicles located close to each other at the same time will scan the same frequency range.

The frequency list 54 stores the status of use of each frequency with respect to the own node and the node at the other end of communication. The frequency list 54 manages the frequency bands in which each node can operate (i.e. in which each node is operable as hardware) by categorizing them into three by their statuses, namely, frequency bands that cannot be used because used by another node, frequency bands at which no response to a probe has been received though not used by other nodes (communication impossible), and frequency bands that are not used by other nodes and in which a response to a probe has been received (communication possible).

<General Outlines of Process>

In the following, the general outlines of the frequency band coordination method according to this embodiment will be described. One characterizing feature of this method resides in that the control channel and the data channel are separated. As the control channel, a low frequency band having a long propagation range is used. As the data channel, a high frequency band having a high transmission rate is used. Thus, each of the transmitting node and the receiving node can recognize the status of the other node using the control channel, and therefore they can determine a data channel that meets the application's requirements.

There is a possibility that the frequency use status may change after the control channel and the data channel have been determined. In view of this, information is exchanged using the control channel at regular intervals, and the control channel and the data channel are changed based on the result. Such information exchange at regular intervals enables quick changing of the channels.

Figure 2:
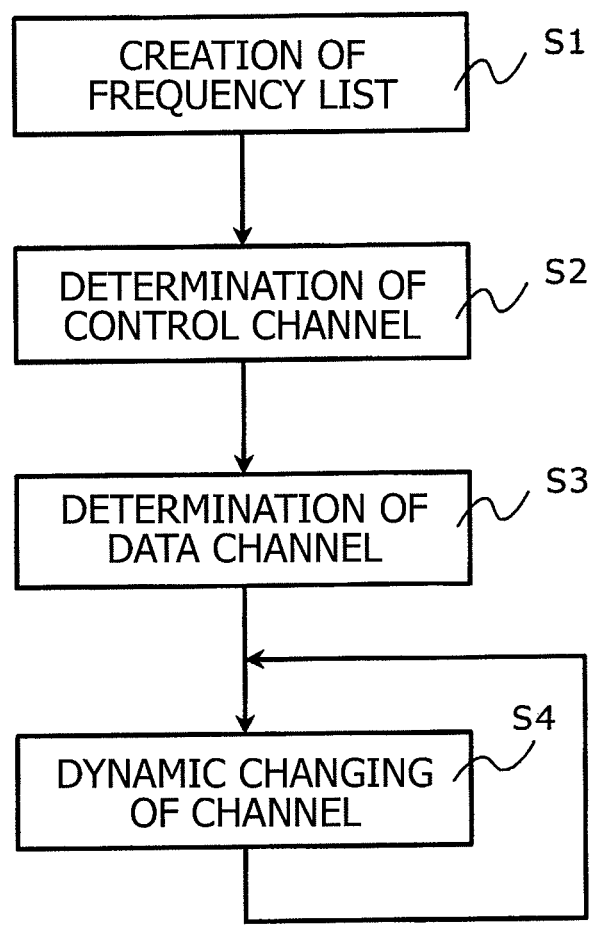
FIG. 2 is a diagram illustrating the general outline of a frequency coordination method in the embodiment.

Now, the outlines of the frequency band coordination method according to this embodiment will be described with reference to FIG. 2. Firstly, each node creates the frequency list 54 (step S1). In this step, frequencies in which each node can operate (i.e. at which each node is operable as hardware) are listed. The frequency list 54 created in this step will be updated as needed from then on in accordance with changes in the environment.

When a communication is started, the control channel is determined first (step S2). The control channel is determined by scanning of frequency state and coordination between the transmitting and receiving nodes, details of which will be described later. In this step, the frequency having the longest propagation distance (i.e. the lowest frequency) among the frequency bands that can be used as the control channel is selected as the control channel, whereby a communication can be established between the transmitting and receiving nodes early. After the control channel has been determined, information on the frequency use status is exchanged at regular intervals using the control channel.

Next, a frequency that is available for use and meets the application's requirements is selected as the data channel based on the frequency lists exchanged between the transmitting and receiving nodes (step S3).

Since the surrounding radio condition changes after the control channel and the data channel have been determined, the frequency lists are exchanged at regular intervals, and the channels are changed dynamically (step S4).

<Details of Process>

In the following, details of the frequency band coordination method according to the present invention will be described.

[Creation of Frequency List]

Figure 3:
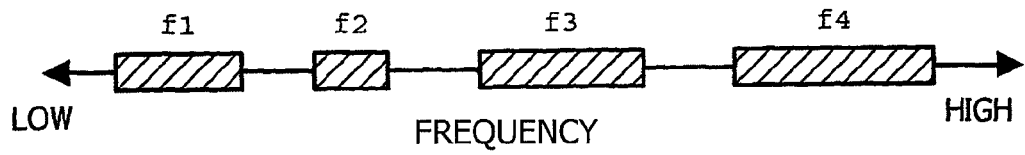
FIG. 3 is a diagram illustrating frequency lists.
Figure 3:
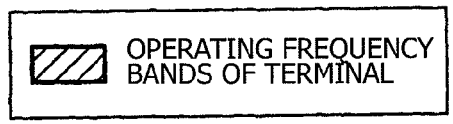

Firstly, listing of usable frequencies (step S1 in FIG. 2) that is needed at the time when moving terminals newly start a one-to-one communication will be described. As shown in FIG. 3, each of the transmitting node and the receiving node lists frequencies usable by its own apparatus (which will be hereinafter referred to as the "operating frequency bands of the terminal" or simply referred to as the "operating frequency bands") in the frequency list 54. The "status" field in the frequency list 54 will be updated later based on the surrounding condition and communication state between the transmitting and receiving nodes.

[Control Channel Determination Process]

A specific process of the control channel determination process (step S2 in FIG. 2) will be described with reference to FIGS. 4 to 7. The following process is performed by the communication control section 51 by controlling the radio condition sensing section 52 etc, and the communication control section 51 corresponds to the control channel determination means according to the present invention.

Figure 4:
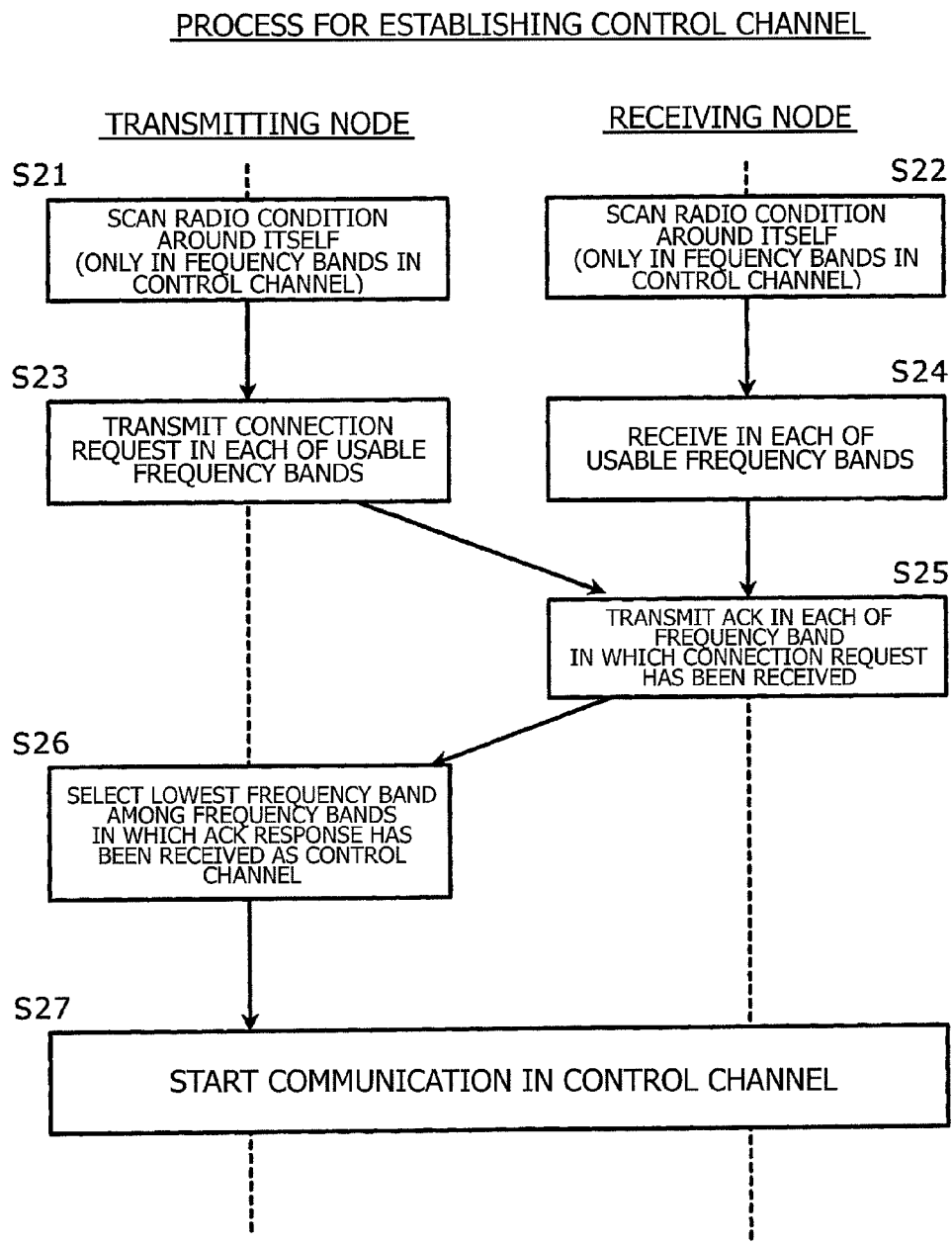
FIG. 4 is a chart showing the flow of a process for establishing a control channel.
Figure 5A:
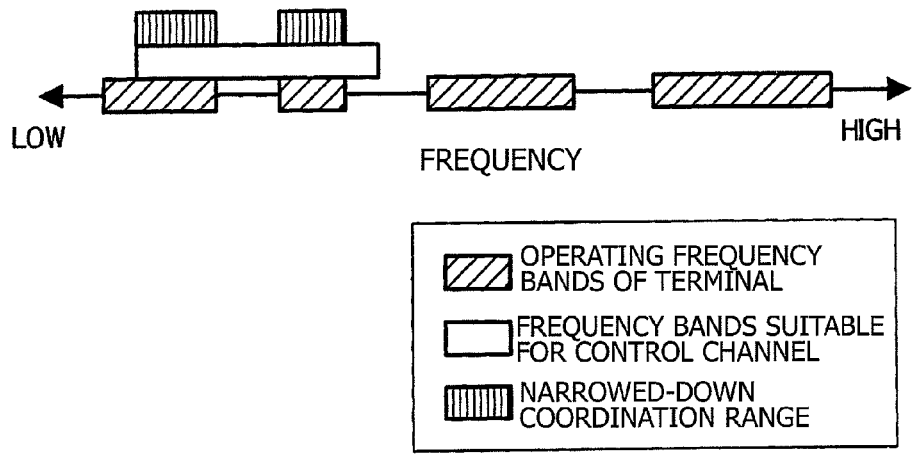
FIG. 5A is a diagram showing a range over which scanning of the radio condition is performed at the time of establishing the control channel.

Firstly, each of the transmitting node and the receiving node scans the radio condition around itself by the radio condition sensing section 52 (steps S21 and S22 in FIG. 4). Since each node can be adapted to a wide range of frequencies, it is difficult to determine the channel quickly, if all the frequency bands are scanned. Therefore, as shown in FIG. 5A, the very wide range of the frequency bands is narrowed down to a certain size of range using the following two indices. The first index is the frequency bands in which the radio terminal itself can operate, and the second index is the frequency bands that are suitable for the control channel. The frequency bands suitable for the control channel are independent from and the same among applications, and it may be set in the radio terminals in advance. FIG. 5A shows frequency bands having been roughly narrowed down using these two indices.

However, even if the range has been narrowed using the two indices, interference may occur if uses of frequencies by a plurality of terminals concentrate in the same frequency band. In view of this, it is preferred that the range of the frequency bands be further narrowed down so that interference of frequency bands with terminals other than the terminal at the other end of communication does not occur.

Figure 5B:
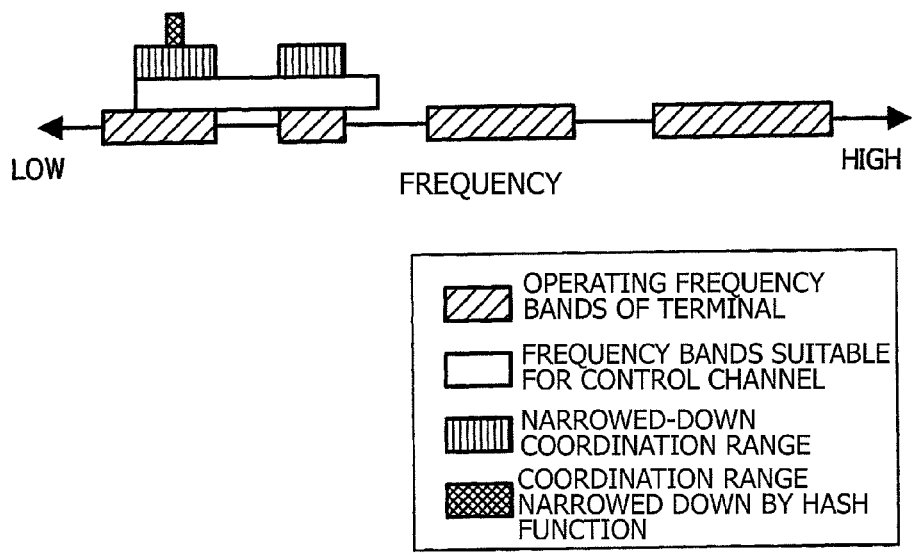
FIG. 5B is a diagram showing a range over which scanning of the radio condition is performed at the time of establishing the control channel.
Figure 6:
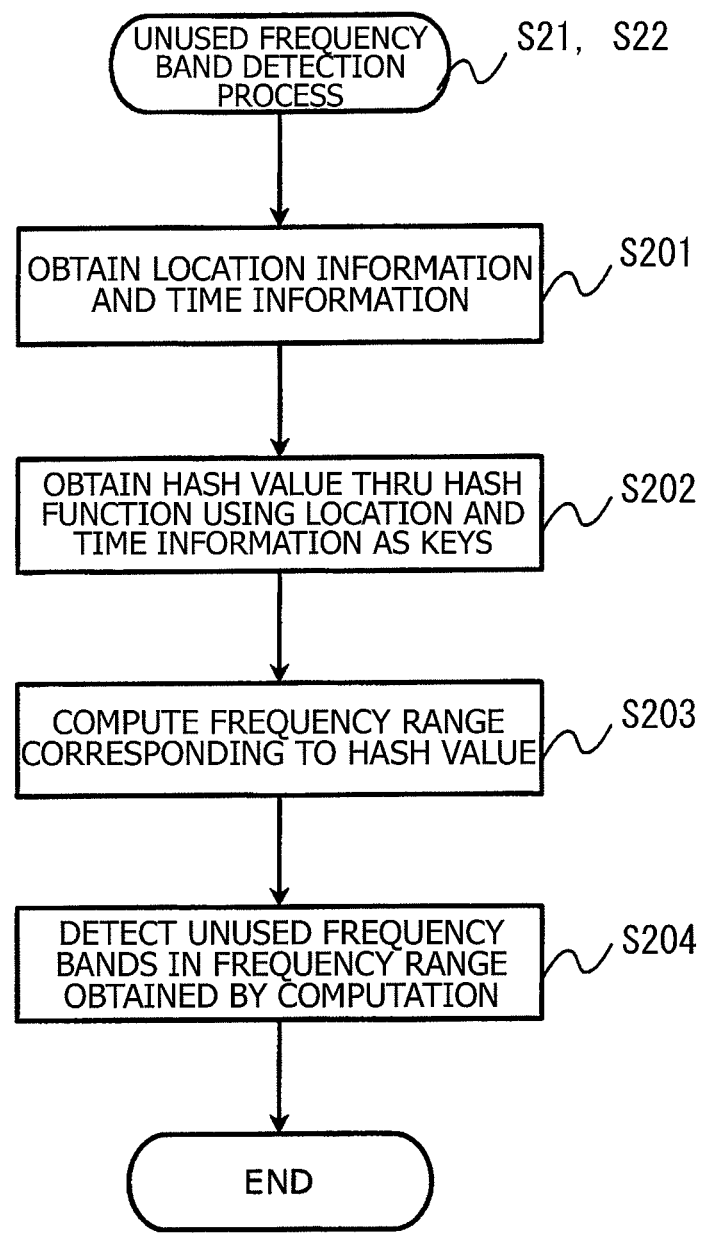
FIG. 6 is a flow chart illustrating the flow of a process of detecting unused frequency bands at the time of establishing the control channel.

To this end, location information and time information obtained through the GPS apparatus 6 is input to the hash function 53, and the scanning range is further narrowed down based on the obtained hash value (FIG. 5B). Specifically, as shown in FIG. 6, location information and time information are firstly obtained through the GPS apparatus 6 (step S201), and they are used as keys in the hash function to obtain a hash value (step S202). Then, the frequency range corresponding to the hash value is computed (step S203). The correspondence between hash values and frequency ranges may be established in any way. The simplest implementation is limiting the frequency range by H and H+$\Delta f$, where H is the obtained hash value, and $\Delta f$ is a predetermined frequency width. Then, detection of unused frequency bands is performed in the frequency range obtained by the computation (step S204).

By further narrowing the scanning range in this way, the frequency band detection process can be done more quickly. Furthermore, since what is input to the hash function is location information and time information, terminals located close to each other at the same time will scan the same frequency range, and they can find a frequency band(s) that can be used in common by them. In addition, at different locations or at different times, different frequency bands will be subject to scanning, and therefore efficient frequency utilization can be achieved.

Although a case in which only one hash function is used has been described heretofore, a plurality of kinds of hash functions may be used, and a plurality of scanning ranges obtained from them may be scanned, whereby usable frequency bands can be detected quickly with reliability even at a time when the frequency utilization rate is high.

Figure 7:
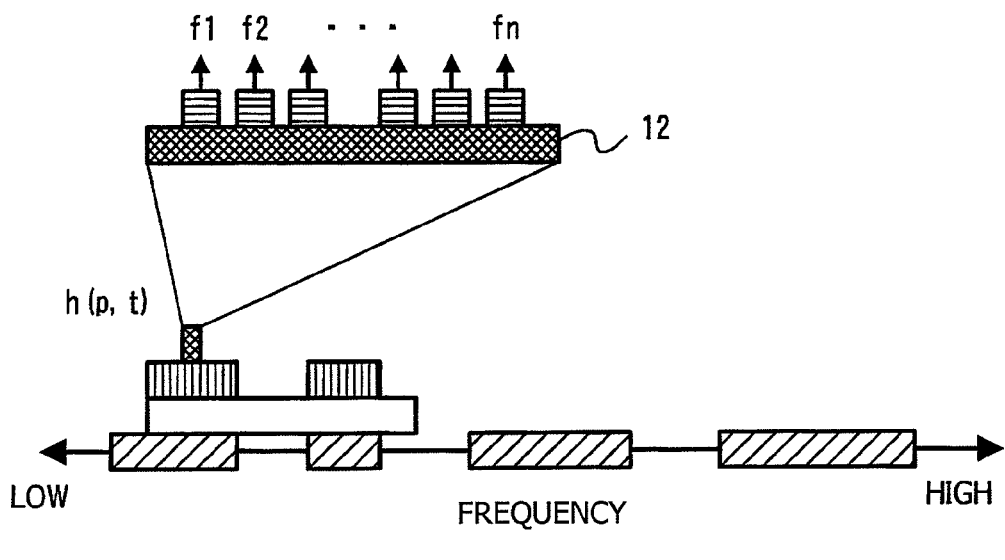
FIG. 7 is a diagram illustrating unused frequencies that constitute candidates for the control channel at the time of establishing the control channel.
Figure 7:
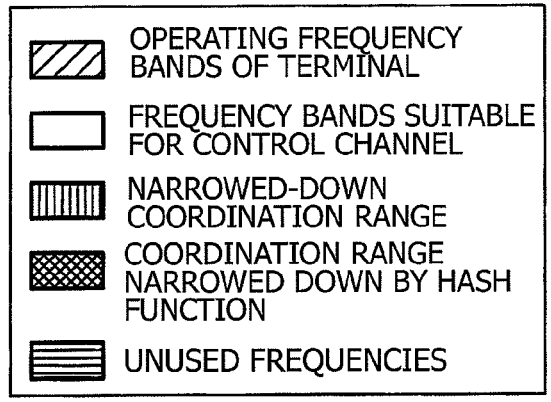

The transmitting node transmits (step S23 in FIG. 4), after completion of the scanning of its own surrounding radio condition, a connection request in each of the usable frequency bands as shown in FIG. 7. On the other hand, the receiving node receives communication addressed to it in each of the usable frequency bands (step S24), and transmits an ACK (acknowledgement) in each of the frequency bands in which it has received the connection request (step S25). In the case described herein, it is assumed that data is not appended to the ACK packet, in order to reduce the overhead.

In consequence of the above process, it is confirmed that the frequency bands in which the transmitting node has received the ACK can be actually used for communication between the transmitting node and the receiving node. Therefore, the transmitting node selects the lowest frequency band among the frequency bands in which the ACK has been received as the frequency band to be used as the control channel (step S26). Then, a communication between the transmitting node and the receiving node is started using the selected frequency band as the control channel (step S27).

[Data Channel Determination Process]

Figure 8:
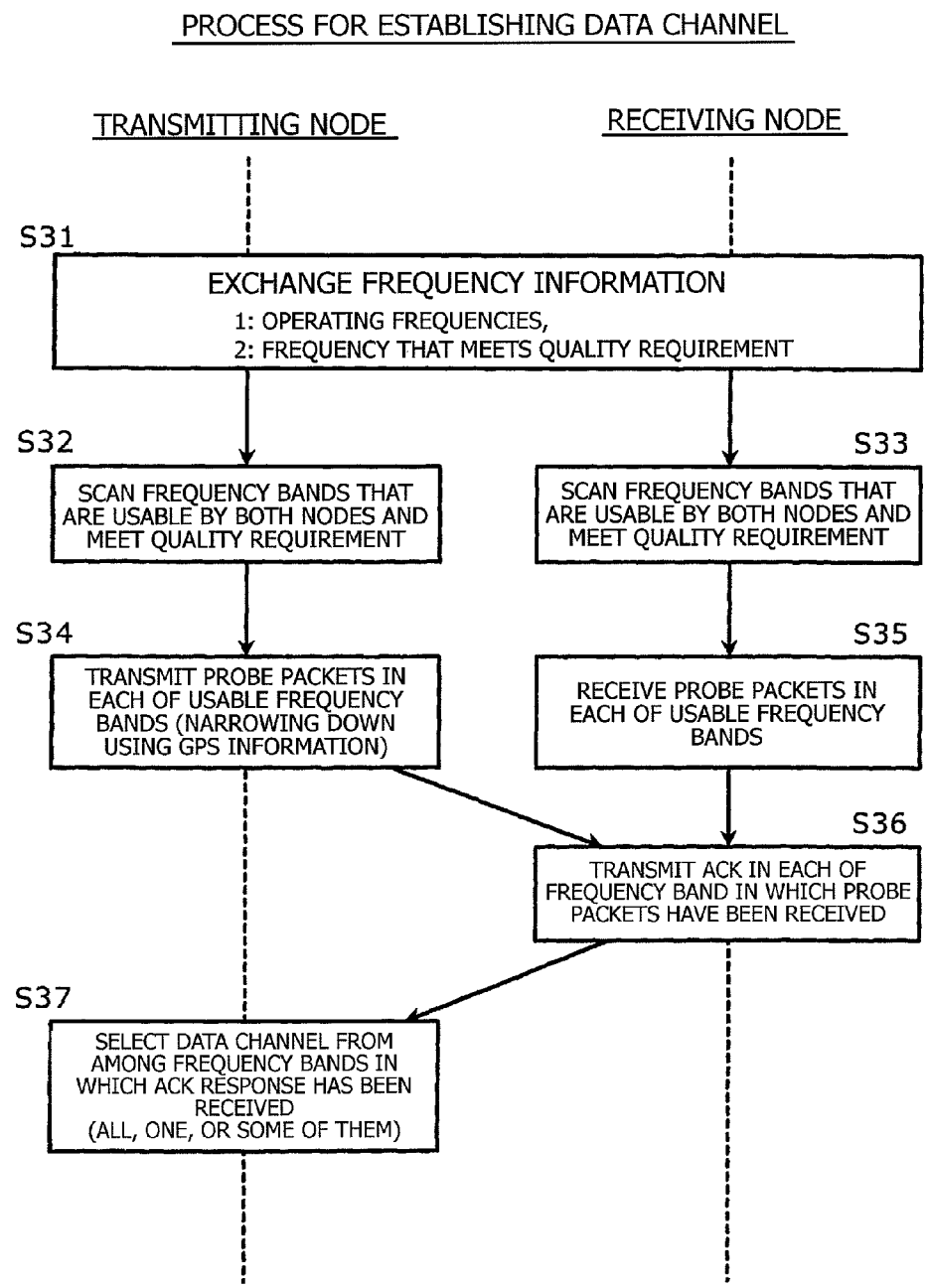
FIG. 8 is a chart showing the flow of a process for establishing a data channel.
Figure 9:
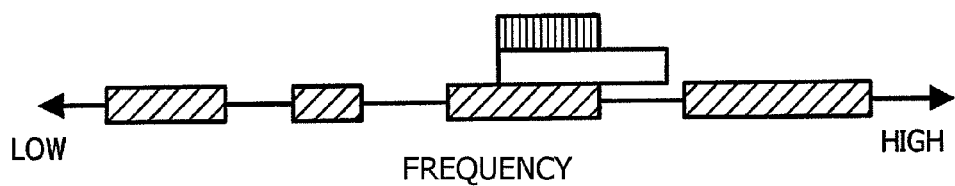
FIG. 9 is a diagram showing a range over which scanning of the radio condition is performed at the time of establishing the data channel.
Figure 9:
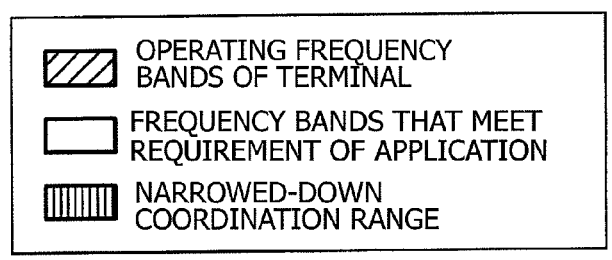

Next, specific processing of the data channel determination process (step S3 in FIG. 2) will be described with reference to FIGS. 8 to 10. The following process is performed by the communication control section 51 by controlling the radio condition sensing section 52 etc, and the communication control section 51 corresponds to the data channel determination means according to the present invention.

After the control channel is determined, frequency information is exchanged using that channel (step S31). The frequency information exchanged in this step includes the operating frequencies of the terminal, frequencies that cannot be used due to communications performed by primary or other users, and a list of frequency bands that meet the quality requirements. It is sufficient that the frequency information be notified to either the receiving node or the transmitting node, and it is not necessarily needed that the information be shared between the transmitting node and the receiving node. Frequencies that cannot be used temporarily need not necessarily be transmitted at this timing.

After completion of the exchange of frequency information, coordination for determining the data channel is performed while narrowing down the range of the frequency bands. A wide range of frequency bands is narrowed down to a range over which the coordination is actually performed, based on two indices, or the operating frequencies and frequency bands that meet the application's quality requirements. Among them, the "frequency bands that meet the application's quality requirements" may differ among applications that perform communication. By these indices, the range of the scanning performed to determine the data channel is determined as shown in FIG. 9. The transmitting node and the receiving node perform detection of frequency bands that can be used by themselves respectively in this range (step S32, S33). In the process of determining the data channel, the narrowing-down of the scanning range using a hash function is not employed.

Figure 10:
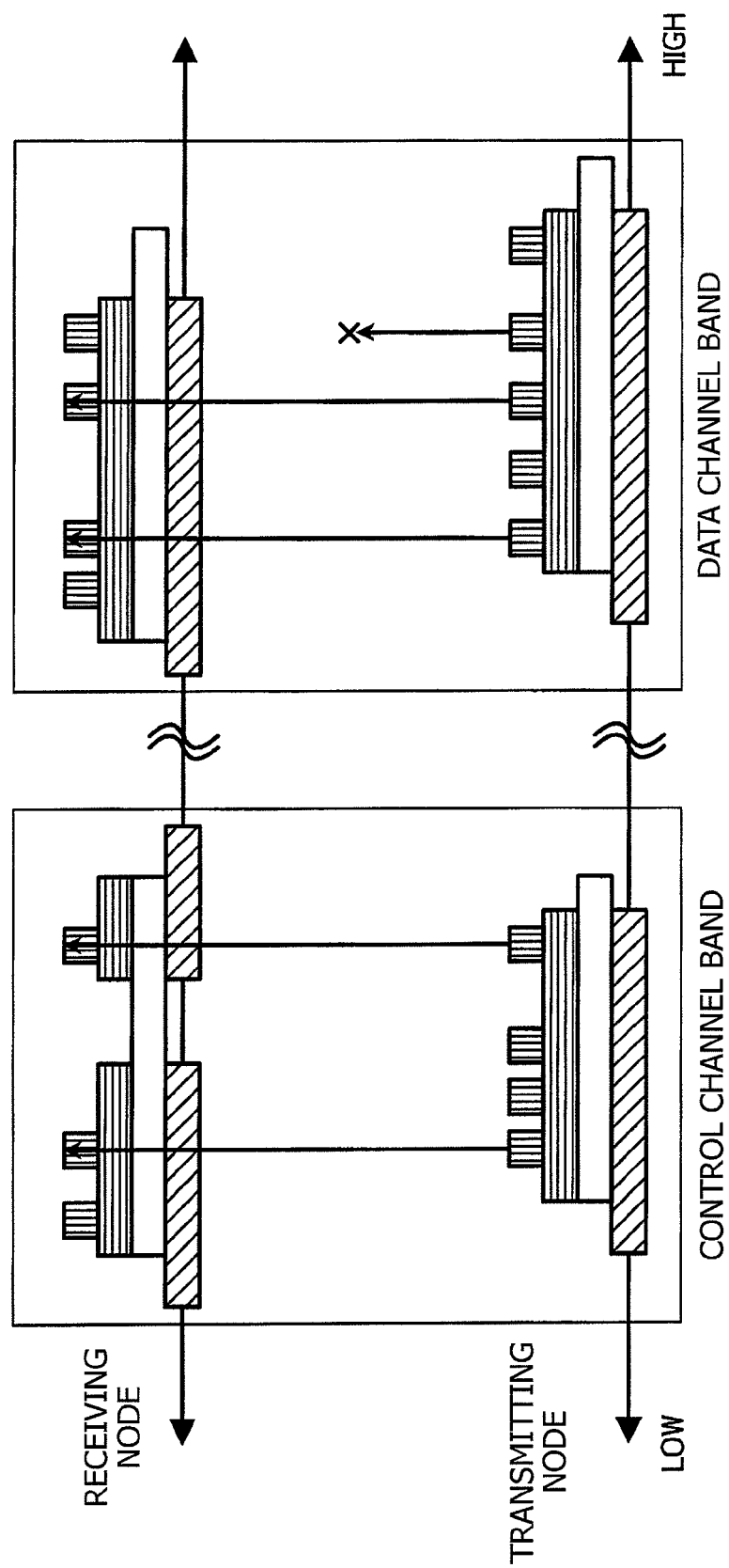
FIG. 10 is a diagram illustrating transmission of probe packets at the time of establishing the data channel.

Then, the transmitting node transmits probe packets using frequency bands that are available for use by it in the scanning range (step S34) as shown in FIG. 10. In this step, the transmitting node may transmit the probe packets using all the frequency bands that are usable by it. However, the higher the frequency is, the shorter the propagation distance is, and harder the probe packets are delivered. In view of this, the transmitting node and the receiving node obtain their own location information from the GPS apparatus 6 and communicate their own location information to the other nodes using the control channel. The transmitting node computes the distance between the transmitting node and the receiving node, compares it with the propagation distance of each frequency band, and transmits the probe packets at frequencies in the range in which the probe packets will be delivered for sure. Thus, the efficiency of the data channel determination process is improved.

On the other hand, the receiving node receives packets addressed to itself in the frequency bands that have been determined, in consequence of the scanning, to be usable by it (step S35), and transmits an ACK in each of the frequency bands in which the probe packets have been received (step S36).

In consequence of the above process, it is confirmed that the frequency bands in which the transmitting node have received the ACK can actually be used for communication between the transmitting node and the receiving node. Based on the status of reception of the probe packets, the "status" field in the frequency list 54 is updated. Here, the use statuses of respective frequencies are categorized into three, namely "1", "0", and "−1" as shown in FIG. 11. Indicated by the three statuses are as follows:

1: the ACK responding to the probe packets has been received, namely the frequency can be used for communication at any time, 0: the ACK has not been returned, namely the frequency is out of the range in which data communication can be performed, or the frequency is being used by a primary or other user in the neighborhood of the receiving side (i.e. there is a possibility that it will become usable later), −1: the frequency is used by a primary or other user in the neighborhood of the transmitting side, namely the frequency cannot be used for data communication.

The transmitting node determines frequency bands to be used as the data channels from among the frequency bands in which the ACK has been received (step S37).

It is considered that there will be, generally, a plurality of frequencies that can be used for data communication. In such cases, the number of data channels is determined in accordance with the required quality and the surrounding condition. For example, in the case where there are no other terminals around, all the usable frequency bands are used as the data channels. In the case where there are a plurality of terminals around, one or some frequency bands among the usable frequency bands are used as the data channels. In this case, it is actually necessary to determine the number of data channels while considering spectrum sharing. However, in this embodiment, simple, only one frequency band is used as the data channel.

In the case shown in FIG. 11, both of frequencies f5 and f6 that can be used for communication are selected as the data channels. Frequency f4 is not used as a data channel, because it has a status of "−1".

[Dynamic Channel Changing]

By the above-described process, the control channel and the data channel are determined at the time of establishing a communication. As the terminals move, the respective surrounding conditions around the transmitting node and the receiving node change frequently. Therefore, while a communication is performed between the transmitting node and the receiving node, it is necessary to dynamically change the control channel and the data channel having been once determined, in accordance with the surrounding conditions.

Figure 12:
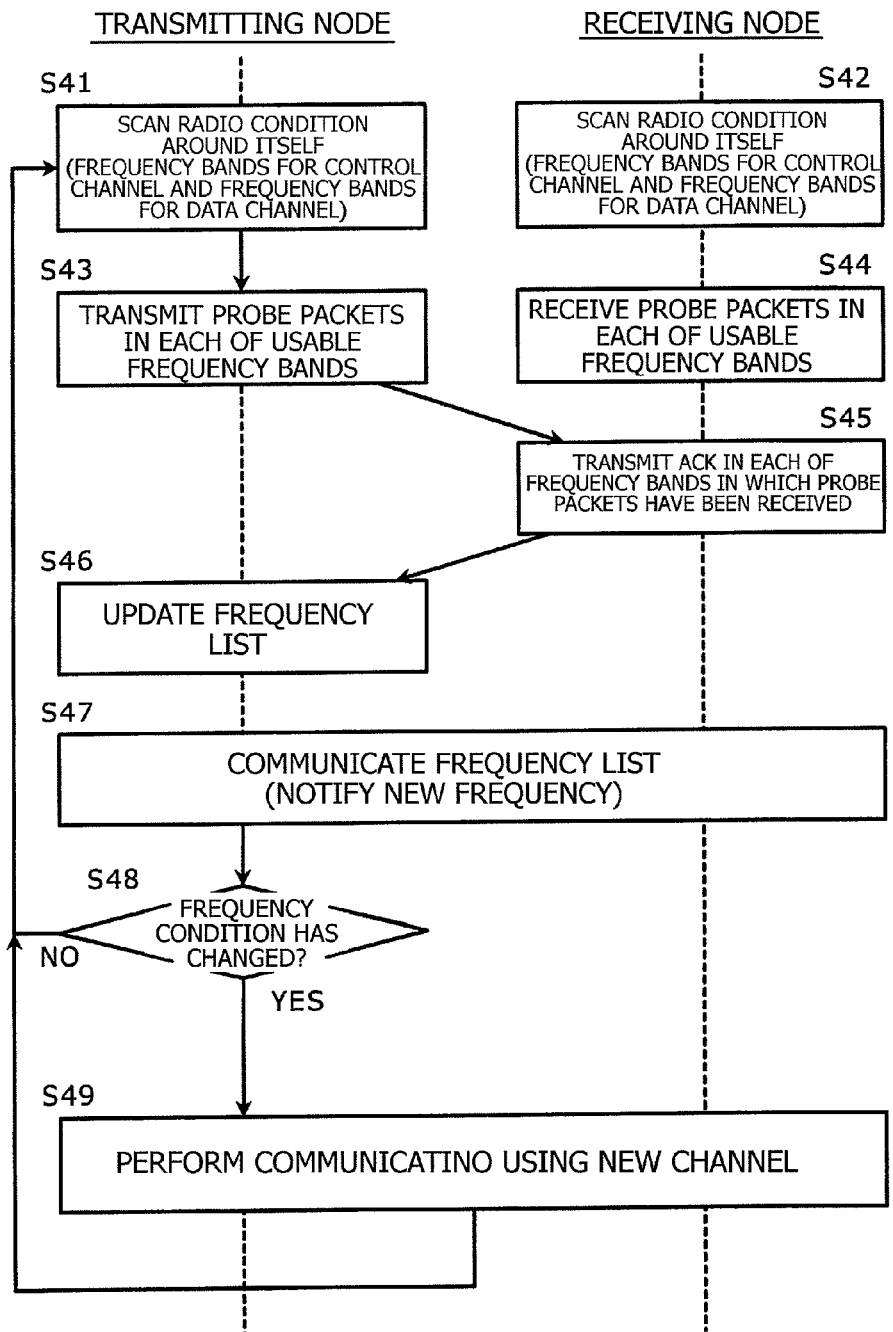
FIG. 12 is a chart showing a dynamic channel changing process performed during communication.
Figure 13:
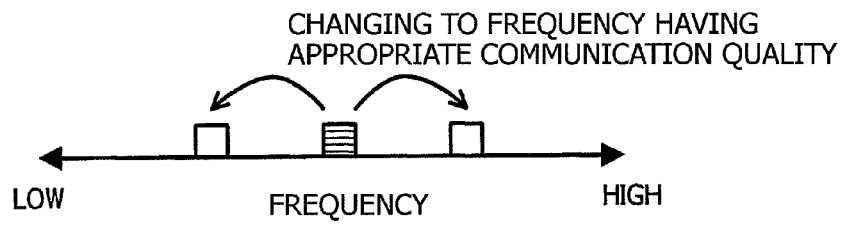
FIG. 13 is a diagram showing a channel changing policy in the dynamic channel changing.
Figure 13:
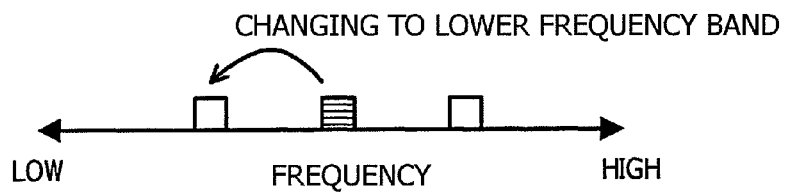

In the following, the dynamic channel changing process (step S4 in FIG. 2) will be described with reference to FIGS. 12 and 13. The following process is performed by the communication control section 51 by controlling the radio condition sensing section 52 etc, and the communication control section 51 corresponds to the channel changing means according to the present invention.

After the control channel and the data channel have been determined, the transmitting node and the receiving node perform sensing of their respective surrounding radio conditions at regular intervals (steps S41 and S42). The scanning range in this sensing includes the frequency band being used as the control channel and the frequency band being used as the data channel. The method of determining the scanning range for each channel has been described in the explanation of the connection establishing process, and it will not be described here.

Based on the result of the scanning, the transmitting node transmits probe packets in frequency bands that are usable by itself (step S43), and the receiving node returns an ACK in the frequency bands in which it has received the probe packets (steps S44, S45). When transmitting the probe packets, the transmitting node does not transmit the probe packets in the frequency bands that have been determined to be unusable by the receiving node (i.e. the frequency bands having a status of "−1" in the frequency list), whereby the efficiency of the process can be improved. On the other hand, the transmitting node transmits the probe packets in the frequency band that are usable by the receiving node regardless of whether their status is "1" or "0".

The transmitting node updates the frequency list 54 based on the status of reception of the ACK responding to the probe packets (step S46), and communicates the updated frequency list 54 to the receiving node using the control channel (step S47).

Then, the transmitting node makes a determination as to whether or not it is necessary to change the control channel or the data channel due to a change in the frequency state (step S48). If the frequency state has not changed (NO in S48), the transmitting node returns to the process of scanning the radio condition. If the frequency state has changed and it is necessary to change the control channel and/or the data channel (YES in S48), the transmitting node performs a communication using a new frequency band (step S49).

To enable quick channel changing, a new frequency is determined beforehand at regular intervals based on the communication state at that time. For example, when the transmitting node communicates the frequency list to the receiving node in step S49, the transmitting node may notify the receiving node of a candidate for the new frequency band. Alternatively, a new frequency band may be determined based on the frequency list in conformity with a policy that is common between the transmitting node and the receiving node. (In this case also, a new frequency is considered to be determined beforehand, at the time when the frequency list is sent to the receiving node).

The frequency is changed to a new frequency, which is determined most suitable for the transmitting node and the receiving node, based on the frequency lists 54 that are exchanged at regular intervals. Since the control channel is used for the information sharing between the transmitting side and receiving side and management of the data channel, it is necessary that an interruption of the control channel be prevented whenever possible. Therefore, it is preferred that deterioration in the communication quality be sensed and the frequency being used be changed before the communication is interrupted. It is also preferred that a plurality of new frequencies be determined in advance, and the channel change be achieved reliably. In the case of the data channel also, changing to an appropriate channel is performed by the method same as that for the control channel, and the notification of the channel change is made through the control channel.

Here, a specific policy of changing the frequency will be described. First, in the case where a communication by a primary or other communication is detected, the frequency may be changed to a frequency having an appropriate quality for communication regardless of whether the frequency is higher or lower, because the communication quality has not been deteriorated in this case (FIG. 13A). On the other hand, in the case where the communication quality is deteriorated, since it is considered that the propagation range of the channel being used has become shorter than the distance between the transmitting node and the receiving node, the frequency is changed to a lower frequency, which has a longer propagation distance.

Deterioration in the communication quality can be detected based on information on the number of frame retransmissions. To detect deterioration in the communication quality, the distance between the transmitting node and the receiving node may be computed based on location information obtained through the GPS apparatus, and the distance may be compared with the propagation distance at each frequency to detect a movement that causes an excess beyond the propagation distance. Then, timing at which the channel should be changed can be determined in advance.

<Operation and Effects of This Embodiment>

By the frequency band coordination method in the cognitive radio system according to this embodiment, a frequency band that both a transmitting node and a receiving node located close to each other can use as a control channel can be determined quickly from among widely ranging frequency bands. By narrowing the scanning range based on a hash value obtained by using location information and time information as keys, a quicker determination can be made. A frequency that meets application's requirements can be determined quickly using the established control channel. Furthermore, by sensing dynamic changes in the frequency use status and reliably performing information exchange between the transmitting side and the receiving side, it is possible to change the frequencies used as the control channel and the data channel.

(Modifications)

The above-described embodiment is a specific mode of the present invention presented merely by way of example. The scope of the present invention is not limited to the above-described embodiment, but various modifications can be made thereto within the technical concept of the present invention.

For example, the process of actually determining the control channel after the detection of frequencies usable by nodes may be implemented by methods other than the method described above. For example, the transmitting node may transmit a connection request using some (or one) of the frequencies usable by itself, and information on the frequencies usable by itself may be contained in the connection request. Then, if the receiving node receives at least one connection request, it can recognize the frequencies usable by the transmitting node. The receiving node may transmit an ACK using some (or one) of the frequencies at which it has received the connection request, and information on the frequencies usable by itself may be contained in the ACK. Then, if the transmitting node receives at least one ACK, it can recognize the frequencies usable by the receiving node.

Although the frequency range to be scanned is narrowed down using a hash function in the control channel determination process, this narrowing-down is not essential. If the scanning process can be performed quickly, the narrowing-down process may be eliminated, and the scanning of the frequency state may be performed in the entire frequency range that is suitable for the control channel.

Although in the data channel determination process, the transmitting node transmits probe packets and selects a frequency band in which an ACK is returned as the data channel, this process may be eliminated. If a frequency band is determined to be usable by both the transmitting node and the receiving node in consequence of scanning performed by these nodes, it is highly likely that communication can be performed using that frequency band. Therefore, such a frequency band may be selected as the data channel without performing a verification using probe packets. Especially in the case where the distance between the transmitting node and the receiving node can be determined based on GPS information, a verification using probe packets may be eliminated. This also applies not only to the process of establishing the data channel but also to the process of determining a candidate for the new frequency band. Nevertheless, using probe packets enables reliable determination as to whether or not the frequency band is actually usable, and consequently enables more reliable frequency coordination.

Reference Sign List

1: radio communication apparatus
5: digital signal processing section
6: GPS apparatus
51: communication control section
52: radio condition sensing section
53: hash function
54: frequency list

The invention claimed is:

1. A frequency band coordination method in a cognitive radio system wherein each of a plurality of autonomous radio communication apparatuses has a hash function in common, each radio communication apparatus acting as a transmitting node when transmitting and acting as a receiving node when receiving, the method comprising:
   an information obtaining step, by one said radio communication apparatus acting as a transmitting node, of obtaining the radio communication apparatus's own location information and current time information;
   a range limiting step, by the one said radio communication apparatus acting as the transmitting node and another said radio communication apparatus acting as a receiving node, of narrowing a frequency range down using the obtained location information, time information and the hash function;
   a detection step, by each of the transmitting node and the receiving node, of detecting usable frequency bands in the narrowed frequency range;
   a request transmission step, by the transmitting node, of transmitting a connection request using the usable frequency bands;
   a response transmission step, by the receiving node, of transmitting an acknowledgement response in a frequency band in which the receiving node has received the connection request; and
   a selection step, by the transmitting node, of selecting, as a control channel, any one of frequency bands in which the transmitting node has received the acknowledgement response.

2. A frequency band coordination method in a cognitive radio system according to claim 1, further comprising a data channel determination step wherein said data channel determination step comprises:

a step of detecting, by each of the transmitting node and the receiving node, usable frequency bands in a frequency range that meet a requirement for data communication;

a step of communicating use status of each frequency band between the transmitting node and the receiving node, through the control channel;

a step of transmitting, by the transmitting node, probe packets using frequency bands that can be used by both the transmitting node and receiving node;

a step of transmitting, by the receiving node, an acknowledgement response in frequency bands in which the receiving node has received the probe packets; and a step of selecting, by the transmitting node, one, some or all of frequency bands in which the transmitting node has received the acknowledgement response, as the data channels.

3. A frequency band coordination method in a cognitive radio system according to claim 2, wherein said data channel determination step further comprises a step of obtaining, by the transmitting node, location information of itself and the receiving node, and in said step of transmitting the probe packets, the frequency bands in which the probe packets are to be transmitted are further narrowed down based on a distance between the transmitting node and the receiving node.

4. A frequency band coordination method in a cognitive radio system according to claim 2, further comprising a channel changing step of changing the frequency band used as the control channel or the data channel when the control channel or the data channel being used has become unusable or is expected to become unusable, wherein said channel changing step comprises:

a step of detecting, by each of the transmitting node and the receiving node, usable frequency bands in a frequency range that are suitable for the control channel and the data channel;

a step of communicating use status of each frequency band between the transmitting node and the receiving node, through the control channel;

a step of transmitting, by the transmitting node, probe packets using frequency bands that can be used by both the transmitting node and receiving node; and a step of transmitting, by the receiving node, an acknowledgement response in frequency bands in which the receiving node has received the probe packets, wherein frequency bands to which the control channel and the data channel are to be changed are selected from among frequency bands in which the transmitting node has received the acknowledgement response.

5. A frequency band coordination method in a cognitive radio system according to claim 4, wherein said channel changing step further comprises a step of notifying, by the transmitting node, the receiving node of frequency bands in which the transmitting node has received the acknowledgement response, through the control channel, wherein each of the transmitting node and the receiving node selects frequency bands to which the control channel and the data channel are to be changed from among frequency bands in which the acknowledgement response has been received, according to a common policy.

6. A frequency band coordination method in a cognitive radio system according to claim 4, wherein in said channel changing step, in the case where the control channel or the data channel has become or is expected to become unusable due to deterioration in communication quality, a lower frequency band is selected as a frequency band to which the channel is to be changed, and in the case where the control channel or the data channel has become or is expected to become unusable due to a communication started by a node other than the transmitting node and the receiving node, a frequency band having an appropriate quality for communication is selected as a frequency band to which the channel is to be changed.

7. A radio communication apparatus in a cognitive radio system comprising:

a storage unit adapted to store a hash function;

an information acquisition unit adapted to obtain the radio communication apparatus's own location information and current time information;

a range limitation unit adapted to narrow a frequency range down using the obtained location information, time information and the hash function;

a detection unit adapted to detect usable frequency bands in the narrowed frequency range;

a request transmission unit adapted to transmit a connection request using the usable frequency bands;

a response transmission unit adapted to transmit an acknowledgement response in frequency bands in which it has received the connection request; and a selection unit adapted to select, as the control channel, any one of frequency bands in which it has received the acknowledgement response.

\* \* \* \* \*